(12) United States Patent
Stein et al.

(10) Patent No.: US 8,989,311 B2
(45) Date of Patent: Mar. 24, 2015

(54) METHODS AND SYSTEMS FOR IMPROVED CHANNEL ESTIMATION IN MULTI-CARRIER SYSTEMS

(75) Inventors: Jeremy M. Stein, Haifa (IL); James E. Beckman, San Diego, CA (US); Joseph C. Chan, San Diego, CA (US); Michael Leviant, Yoqneam (IL)

(73) Assignee: QUALCOMM Incorporated, San Diego, CA (US)

( * ) Notice: Subject to any disclaimer, the term of this patent is extended or adjusted under 35 U.S.C. 154(b) by 955 days.

(21) Appl. No.: 12/888,242

(22) Filed: Sep. 22, 2010

(65) Prior Publication Data

US 2012/0069937 A1    Mar. 22, 2012

(51) Int. Cl.
| | | |
|---|---|---|
| H04L 27/06 | (2006.01) | |
| H03K 9/00 | (2006.01) | |
| H04L 25/02 | (2006.01) | |

(52) U.S. Cl.
CPC .......... *H04L 25/0232* (2013.01); *H04L 25/024* (2013.01)
USPC ............................. 375/316; 375/340; 375/346

(58) Field of Classification Search
USPC ......... 375/220, 219, 295, 316, 324, 340, 346, 375/347, 349, 350
See application file for complete search history.

(56) References Cited

U.S. PATENT DOCUMENTS

| | | |
|---|---|---|
| 2005/0105647 A1 | 5/2005 | Wilhelmsson et al. |
| 2008/0084817 A1 | 4/2008 | Beckman et al. |
| 2009/0112096 A1* | 4/2009 | Tamura .......................... 600/454 |
| 2010/0086014 A1 | 4/2010 | Wu |
| 2010/0130135 A1* | 5/2010 | Wang et al. ................. 455/67.11 |
| 2010/0290570 A1* | 11/2010 | Sathananthan et al. ....... 375/346 |
| 2011/0255572 A1* | 10/2011 | Giannakis et al. ............ 375/146 |

FOREIGN PATENT DOCUMENTS

| | | |
|---|---|---|
| WO | WO2009025376 A1 | 2/2009 |
| WO | WO 2009025376 A1 * | 2/2009 |
| WO | WO2009120468 | 10/2009 |

OTHER PUBLICATIONS

International Search Report and Written Opinion—PCT/US2011/051263—ISA/EPO—Nov. 28, 2011.
Michael Speth et al., "Optimum Receiver Design for OFDM-Based Broadband Transmission Part II: A Case Study," IEEE Transactions on Communications, vol. 49, No. 4, Apr. 2001.

* cited by examiner

*Primary Examiner* — Sam K Ahn
*Assistant Examiner* — Linda Wong
(74) *Attorney, Agent, or Firm* — Norton Rose Fulbright US LLP

(57) ABSTRACT

Wireless receiver circuits and methods include algorithms for switching between a least-squares/minimum mean-square error method of channel estimation known as the CE algorithm, and a continuous plot method of channel estimation known as the CPCE algorithm based upon channel characteristics to improve reception of wireless communications in different reception conditions. In an embodiment, the CPCE algorithm may be selected by a processor for use in channel estimation when a calculated number of candidate paths is less than or equal to a first threshold value, a calculated power ratio of the L strongest paths to the total of all paths is greater than or equal to a second threshold value, and the maximum Automatic Gain Control variation is greater than or equal to a third threshold value. Threshold values may be based on field testing, and set to values at which the CE or CPCE algorithm exhibits better performance.

72 Claims, 9 Drawing Sheets

METHODS AND SYSTEMS FOR IMPROVED CHANNEL ESTIMATION IN MULTI-CARRIER SYSTEMS

BACKGROUND

Orthogonal frequency-division multiplexing (OFDM) is a wireless data communication technology used in many wireless communications. While OFDM offers a number of performance advantages, such communication links are vulnerable to interference and fading in reception conditions involving multiple reception paths (i.e., multipath conditions) and significant Doppler shifts. As mobile communication devices, such as mobile TV receivers, are implemented in motor vehicles and aircraft, the challenges to signal reception posed by significant Doppler spread are expected to become a common design challenge.

SUMMARY

Generally, OFDM systems require efficient channel estimation strategies. Currently, there are various channel estimation methods in use and described in the literature. Each of these channel estimation methods has its own benefits and features. However, each of these channel estimation methods also has its own set of limitations.

The various embodiments accomplish channel estimation of signals so as to utilize the benefits of multiple channel estimation methods, while limiting the shortcomings of each individual method. The various embodiments include algorithms for switching between a least-squares (LS)/minimum mean-square error (MMSE) method of channel estimation (CE), and a continuous pilot method of channel estimation (CPCE) based upon measurable parameters.

In one embodiment, CPCE may be set as the default channel estimation algorithm, and when CPCE is disabled, CE becomes the primary channel estimation method. In one embodiment, the CPCE method may be disabled when it is determined that the number of candidate paths is greater than a threshold value. In another embodiment, the CPCE method may be disabled when the power ratio of L candidate paths with the most power relative to the power of all the candidate paths is less than a threshold value. For example, in one embodiment L may be 40 candidate paths, and another embodiment L may be 60 candidate paths.

In another embodiment, the CPCE method may be disabled when the Doppler spread, or a proxy or estimation of the Doppler spread, such as the maximum Automatic Gain Control (AGC) variation between OFDM symbols, is less than a threshold value. In the various embodiments, the selection of the CPCE method may be accomplished at the beginning of each burst (acquisition, recovery and reacquisition). In another embodiment, the CPCE method may be disabled when any of the above-mentioned events occur.

In an alternative embodiment, the CE method may be set as the default channel estimation algorithm. In this embodiment, when CE is disabled, CPCE becomes the primary channel estimation method. In this embodiment, the CE method may be disabled when it is determined: that the number of candidate paths is less than or equal to a threshold value; the power ratio of L candidate paths with the most power relative to the power of all the candidate paths is greater than or equal to a threshold value; or the maximum Automatic Gain Control (AGC) variation between OFDM symbols is greater than or equal to a threshold value.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
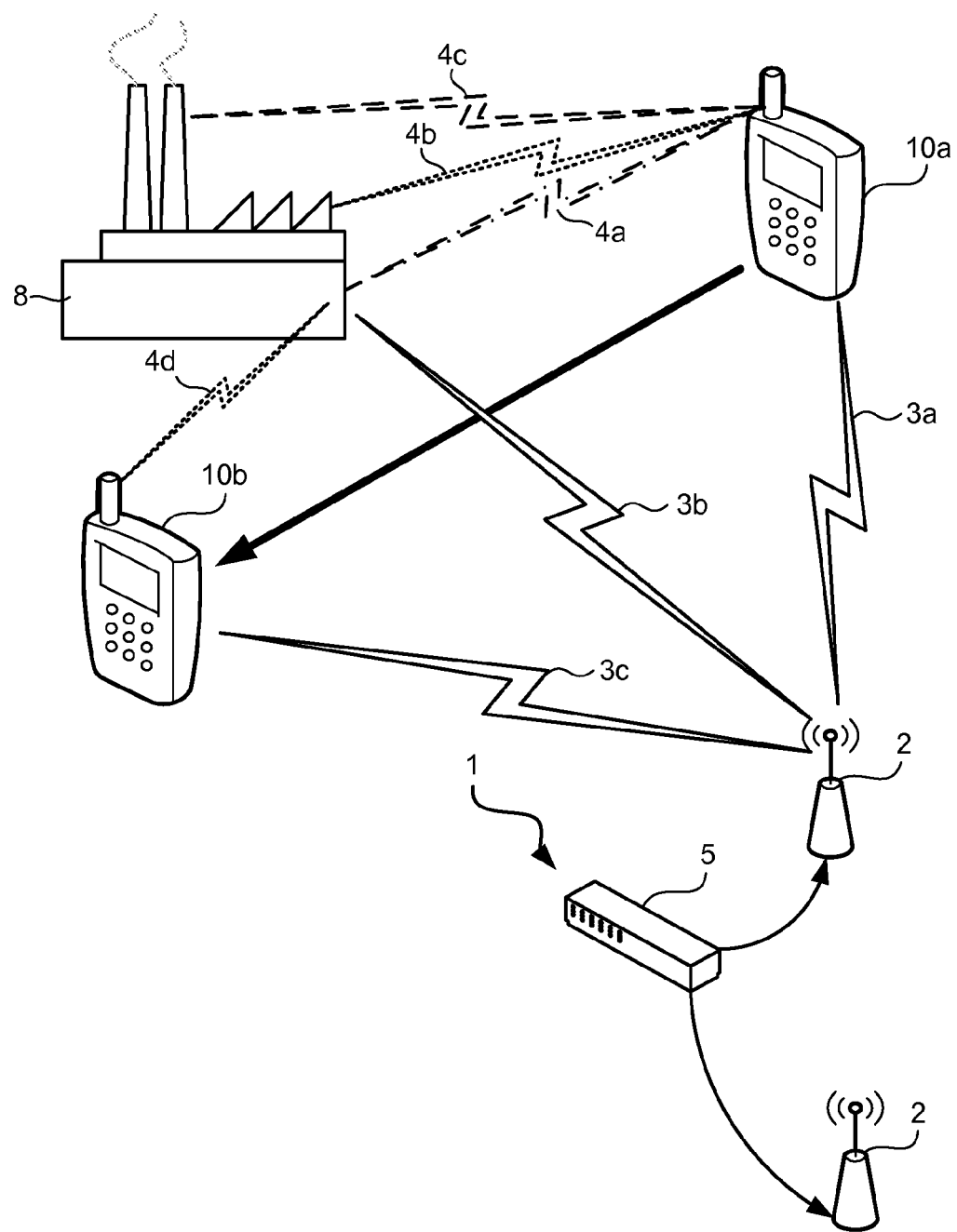
FIG. 1 is a communication system block diagram illustrating communication paths in a typical broadcast communication system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

As used herein, the terms "receiver device" and "receiver" refer to any one or all of wireless communication receivers configured to receive wireless communication signals transmitted in using OFDM encoding and modulation. Such receiver devices may include mobile multimedia broadcast receivers, cellular telephones, and similar personal electronic devices which include receiver circuitry capable of demodulating OFDM symbols, and a programmable processor and memory.

The various embodiments provide channel estimation methods for OFDM communication systems. Specifically, the various embodiments provide a system wherein a different channel estimation method is selected based on various factors. The various embodiments sample the various factors and make a real-time determination as to which channel estimation method should be used. The channel estimation methods and the various factors used to determine which methods used are discussed further below.

The various embodiments relate to data communication and channel estimation in an information transport system using orthogonal frequency division multiplexing (OFDM). An OFDM communication system may use a transmission structure in which data is transmitted in frames or superframes, with each frame having finite time duration. Different types of data (e.g., traffic/packet data, overhead/control data, pilot, and so on) may be sent in different parts of each frame.

The term "pilot" generically refers to data and/or transmission patterns that are known in advance by both the transmitter and a receiver, and therefore can be recognized by the receiver as communicating predetermined information, such as a timing or synchronization pattern.

The channel estimation techniques described herein may be used for various multi-carrier communication systems such as broadcast systems, cellular systems, wireless local area networks (WLANs), and so on. The terms "system" and "network" are often used interchangeably. Cellular systems may utilize Orthogonal Frequency Division Multiple Access (OFDMA), Single-Carrier FDMA (SC-FDMA), Code Division Multiple Access (CDMA), or some other multiple access techniques. These systems and networks may utilize OFDM, SC-FDM, or some other multi-carrier modulation techniques.

For ease of reference and as one example, the embodiments are described below with reference to a broadcast system that implements Digital Video Broadcasting for Handhelds (DVB-H). DVB-H supports digital transmission of multimedia over a terrestrial communication network and utilizes OFDM. DVB-H is described in ETSI EN 300 744, entitled "Digital Video Broadcasting (DVB); Framing structure, channel coding and modulation for digital terrestrial television," November 2004, which is publicly available.

An example OFDM communication system is illustrated in FIG. 1. One type of communication system that uses OFDM transmissions is mobile broadcast television. A mobile broadcast television system 1 may include a plurality of transmission towers 2 connected to a broadcast system 5. The transmission towers 2 broadcast radio frequency signals 3a-3c encoded using OFDM techniques for reception by communication devices 10a, 10b.

FIG. 1 also illustrates the problem of channel fading due to multipath interference. A mobile communication device in one location 10a may receive broadcast signals via a direct transmission path 3a between the device and the nearest transmission tower 2. The mobile communication device 10a may also receive additional signals 4a, 4b, 4c that have traveled via an indirect path ("multipath") such as may be caused by broadcast signals 3b reflected off of mountains, buildings 8, and other structures.

Since multipath signals 4a, 4b, 4c travel a longer distance, they arrive at the mobile communication device 10a after the direct transmission path signal 3a. The difference in arrival times of direct- and indirect-path signals is referred to as "delay spread." As result, one or more of the multipath signals 4a, 4b, 4c may destructively interfere with the direct transmission path signal 3a, causing the signal to "fade." Also, delay spread exceeding the sampling rate period introduces frequency-selectivity. When communication devices are mobile, such as cellular telephones and mobile television receiver devices, the signal fading conditions may change rapidly as the communication device moves about. This is illustrated by the difference in multipath signals received by a mobile communication device in position 10a compared to the multipath signal 4d received by the mobile communication device when it moves position 10b.

In addition to rapid changes in the multipath signal environment which causes rapid changing in fading characteristics, movement of the mobile device causes frequency shifts due to the Doppler effect in both the direct transmission path signal 3a and the multipath signals 4a, 4b, 4c, 4d. Since the movement of a communication device 10 with respect to transmission towers 2 and with respect to reflection sources such as building 8 will typically be different, the Doppler frequency shift in the direct transmission path signal 3a will often be different than that of multipath signals 4a, 4b, 4c, 4d. The difference in Doppler frequency shift between direct path and multipath signals is referred to as "Doppler spread." The temporal channel variations arising from Doppler spread gives rise to time-selectivity.

The combination of multipath delay and Doppler spread gives rise to time-frequency selectivity, which can cause delay-Doppler fading, or doubly selective fading in channels. Rapidly changing multipath and Doppler spread conditions can complicate the accurate identification and decoding of OFDM signals for doubly selective fading channels.

Channel estimation is a crucial and challenging task in the reception of OFDM transmissions in the presence of Doppler spread and fading. In the presence of doubly-selective fading the filter taps which characterize the frequency selectivity of the channel due to long multipath delay from surrounding scatterers tend to also change very rapidly in time. This is a common fading scenario in mobile applications of OFDM technology (e.g., DVB-H, LTE and WiMAX) as illustrated in FIG. 1.

Channel estimation in OFDM may be viewed as a two-dimensional signal interpolation problem. Complex channel gains correspond to data-carrying frequency subcarriers in a certain timeframe which may be interpolated (in time and frequency) based on given pilot-carrying subcarriers. The Nyquist bound corresponding to uniform sampling and reconstruction of the signal is determined by the channel's delay spread and Doppler spread. Typically, in order to maintain the overall throughput, the amount of available pilots is limited, thus often (e.g., for high level of mobility, high center frequencies) the number of pilots in a signal falls below the number of samples required for perfect reconstruction.

The vast majority of channel estimation algorithms currently in use, or currently described in the literature, are based on a least-squares (LS)/minimum mean-square error (MMSE) optimization of the uniform samples set. An example of such a method for channel estimation in DVB-H is termed "CE," and is disclosed in "Optimum Receiver Design for OFDM-Based Broadband Transmission Part II: A Case Study", Michael Speth, Stefan Fechtel, Gunnar Fock, and Heinrich Meyr, IEEE TRANSACTIONS ON COMMUNICATIONS, VOL. 49, NO. 4, APRIL 2001, the entire contents of which are hereby incorporated by reference. In the CE method, a MMSE interpolation in time of the scattered pilots is performed, providing the extra reliable samples required for perfect reconstruction of the channel in the frequency domain. This method obeys the Shannon-Nyquist sampling theory, hence it is limited to relatively low and intermediate Doppler spreads.

In reception situations of high Doppler spreads, receiver system performance may be improved by using a continuous pilot channel estimation (CPCE) algorithm, as described in U.S. Patent Application Publication No. 2008/0084817 entitled "Channel Estimation For Multi-Carrier Communication" dated Apr. 10, 2008, the entire contents of which are hereby incorporated by reference. The CPCE algorithm exploits the irregularly spaced continuous pilot symbols included in DVB-H broadcast signals, as discussed in more detail further below.

Figure 2:
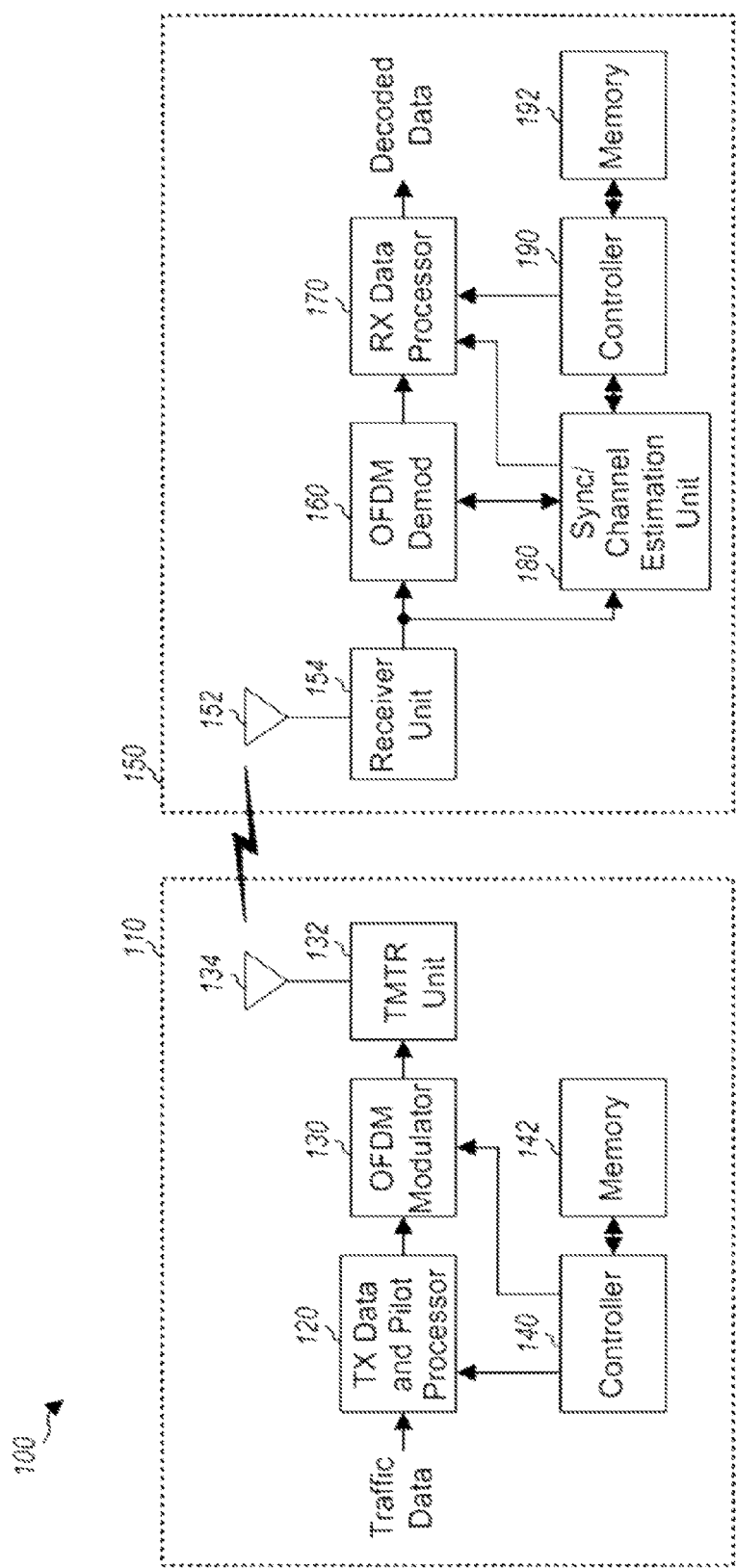
FIG. 2 system block diagram of a transmitter and receiver device suitable for use with the various embodiments.

FIG. 2 illustrates a block diagram of a base station 110 and a wireless receiver device 150 in a typical OFDM system 100. The base station 110 is generally a fixed station and may also be referred to as a base transceiver system (BTS), an access point, or by some other term. A wireless receiver device 150 may be fixed or mobile and may also be referred to as a user terminal, a mobile station, or by some other term. The wireless receiver device 150 may also be a portable unit such as a cellular phone, a handheld device, a wireless module, a personal digital assistant (PDA), a mobile television receiver, or similar electronic device.

At the base station 110, a transmitter (TX) data and pilot processor 120 receives different types of data (e.g., traffic/packet data and overhead/control data) and processes (e.g., encodes, interleaves, and symbol maps) the received data to generate data symbols. As used herein, a "data symbol" is a "modulation symbol" for data, and a "pilot symbol" is a modulation symbol for a pilot. As used herein, a modulation symbol is a complex value for a point in a signal constellation for a modulation scheme (e.g., M-PSK, M-QAM, and so on). The pilot processor 120 also processes pilot data to generate pilot symbols and provides the data and pilot symbols to an OFDM modulator 130.

The OFDM modulator 130 multiplexes the data and pilot symbols onto the proper sub-bands and symbol periods and performs OFDM modulation on the multiplexed symbols to generate OFDM symbols. A transmitter (TMTR) unit 132 converts the OFDM symbols into one or more analog signals, and further conditions (e.g., amplifies, filters, frequency upconverts, etc.) the analog signal(s) to generate a modulated signal. The base station 110 transmits the modulated signal from an antenna 134 for reception by wireless receivers in the OFDM system 100.

At the wireless receiver device 150, the transmitted signal from base station 110 is received by an antenna 152 and provided to a receiver unit 154. The receiver unit 154 conditions (e.g., filters, amplifies, frequency downconverts, etc.) the received signal and digitizes the conditioned signal to obtain a stream of input samples. An OFDM demodulator 160 performs OFDM demodulation on the input samples to obtain received data and pilot symbols. OFDM demodulator 160 also performs detection (e.g., matched filtering) on the received data symbols with a channel estimate (e.g., a frequency response estimate) to obtain detected data symbols, which are estimates of the data symbols sent by base station 110. OFDM demodulator 160 provides the detected data symbols to a receive (RX) data processor 170.

A synchronization/channel estimation unit (SCEU) 180 receives the input samples from the receiver unit 154 and performs synchronization to determine frame and symbol timing, as described below. The SCEU 180 also derives the channel estimate using received pilot symbols from the OFDM demodulator 160. The SCEU 180 provides the symbol timing and channel estimate to the OFDM demodulator 160 and may provide the frame timing to the RX data processor 170 and/or a controller 190. The OFDM demodulator 160 uses the symbol timing to perform OFDM demodulation and uses the channel estimate to perform detection on the received data symbols.

The RX data processor 170 processes (e.g., symbol demaps, deinterleaves, decodes, etc.) the detected data symbols from the OFDM demodulator 160 and provides decoded data. The RX data processor 170 and/or controller 190 may use the frame timing to recover different types of data sent by the base station 110. In general, the processing by the OFDM demodulator 160 and the RX data processor 170 is complementary to the processing by the OFDM modulator 130 and the TX data and the pilot processor 120, respectively, at the base station 110.

Controllers 140, 190 may direct operations at the base station 110 and a wireless receiver device 150, respectively. The controllers 140, 190 may be processors and/or state machines. Memory units 142, 192 may provide storage for program codes and data used by controllers 140 and 190, respectively. The memory units 142, 192 may use various types of storage medium to store information.

The base station 110 may send a point-to-point transmission to a single wireless receiver, a multi-cast transmission to a group of wireless receivers, a broadcast transmission to all wireless receivers under its coverage area, or any combination thereof. For example, the base station 110 may broadcast pilot and overhead/control data to all wireless receivers within its coverage area. The base station 110 may further single-cast transmit user-specific data to specific wireless receivers, multi-cast data to a group of wireless receivers, and/or broadcast data to all wireless receivers in various situations and embodiments.

Figure 3:
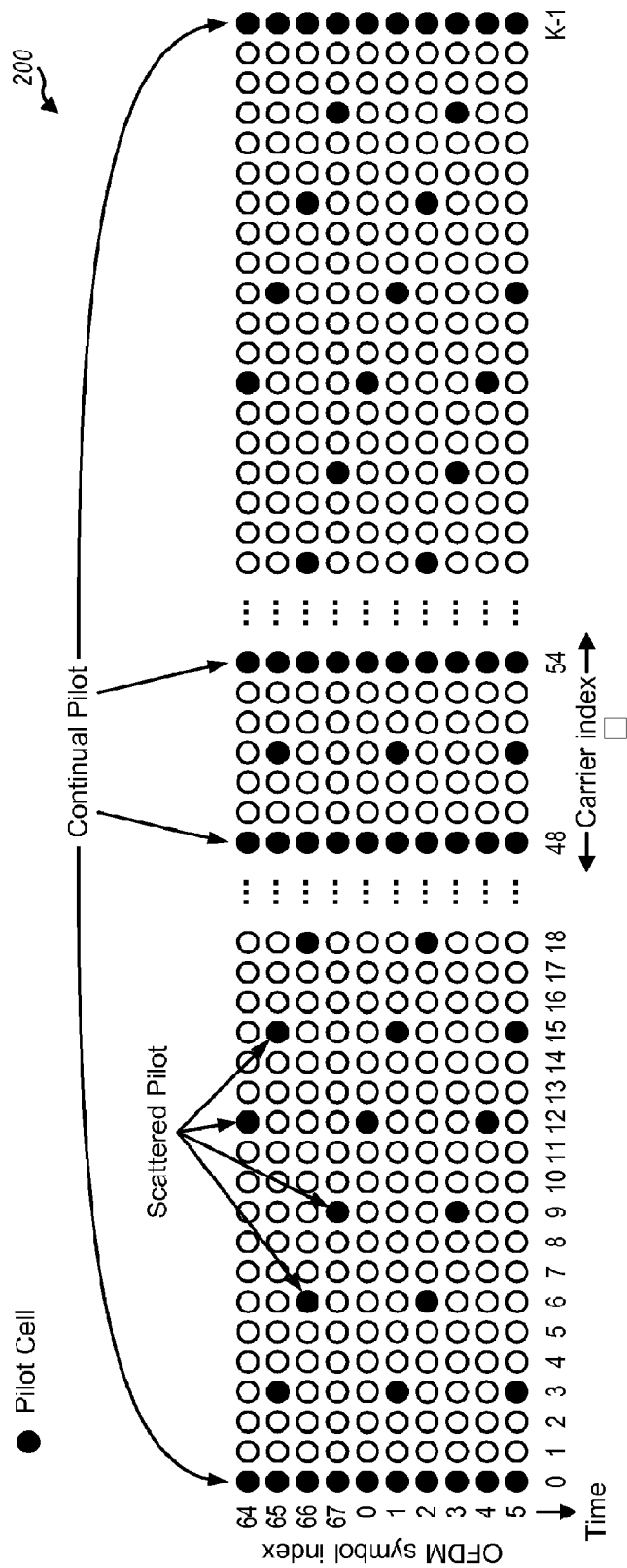
FIG. 3 is an illustration of pilot signals within a DVB-H transmission frame.

A carrier structure 200 for DVB-H is illustrated in FIG. 3. The overall system bandwidth of BW MHz is partitioned into multiple (K) carriers that are given indices of 0 through K-1, where K is a configurable value. The spacing between carriers is BW/K. FIG. 3 also shows a pilot structure for DVB-H, which includes a continual pilot and a scattered pilot. The continual pilot is sent on C carriers that are distributed across the K total carriers, where C is dependent on the operating mode. The continual pilot is sent on the same C carriers in each OFDM symbol period. These C carriers include carriers 0, 48, 54, etc., which are given in ETSI EN 300 744.

The scattered pilot is sent on one of four interlaces in each OFDM symbol period. Each interlace contains approximately K/12 carriers that are uniformly/regularly spaced apart by 12 carriers. Interlace m, for m ∈ {0, 1, 2, 3}, contains carriers $3m$, $3m+12$, $3m+24$, etc., where $3m$ is a pilot offset as well as the index of the first carrier in the interlace. Thus, interlace 0 contains carriers 0, 12, 24, etc., interlace 1 contains carriers 3, 15, 27, etc., interlace 2 contains carriers 6, 18, 30, etc., and interlace 3 contains carriers 9, 21, 33, etc. K is not an integer multiple of 12, and interlace 0 contains one more scattered pilot carrier than interlaces 1, 2 and 3. For simplicity, the following description assumes that all four interlaces contain the same number of (S) scattered pilot carriers.

The transmission timeline for DVB-H is partitioned into frames, with each frame including 68 OFDM symbols that are given indices of 0 through 67. The scattered pilot is sent on interlace m=(n mod 4) in OFDM symbol period n, for n= 0, . . . , 67, where "mod" denotes a modulo operation. The scattered pilot cycles through the four interlaces in each 4-symbol interval.

The scattered pilot samples the wireless channel regularly in both time and frequency. The sampling interval in frequency determines the maximum time span of a channel impulse response. For example, if there is a pilot symbol on every third carrier, then the impulse response of the wireless channel may be estimated unambiguously for ⅓ of the useful OFDM symbol duration, or K/3 sample periods. The sampling interval in time determines the maximum rate of change for which the wireless channel response may be reconstructed in time. For example, if a pilot symbol is sent on a given carrier in every 4 OFDM symbol periods, then this pilot spacing, using Nyquist interpolation criteria, theoretically supports a maximum rate of change of $1/(4\,T_S)/2$ in the wireless channel, where $T_S$ is one OFDM symbol period. This equates to approximately 112 Hz for the 8K mode with ¼ guard interval in an 8 MHz channel. The maximum rate of change of a wireless channel corresponds to the maximum Doppler frequency. A Doppler frequency of 112 Hz corresponds to approximately 100 miles/hour (mph).

A time-domain channel impulse response is composed of a number of (T) channel taps at tap indices 0 through T-1, where T may be any value. Each channel tap is associated with: (1) a specific tap index that corresponds to a specific propagation delay; and (2) a specific complex gain that is determined by the wireless environment. At high mobility, the scattered pilot is insufficiently sampled in time and may cause the channel taps to alias. A true channel tap at a given tap index may then have alias images at other tap indices. These alias images are indistinguishable from the true channel taps at these other tap indices and act as noise that may degrade performance.

The CPCE method of deriving a channel estimate involves using both the scattered pilot and continual pilot. First, the scattered pilot is used to locate or identify the indices of channel taps of interest, e.g., L strongest channel taps, where L may be any value. The continual pilot is then used to determine the complex gains of these L channel taps. As shown in FIG. 3, the continual pilot is sent in each symbol period. This pilot spacing supports a higher maximum Doppler frequency than the scattered pilot. CPCE exploits the irregular spacing of the continual pilot carriers across frequency to obtain higher quality for the channel estimate.

The CE method does not use the continual plot described above. Rather, the CE method uses the scattered pilot along with a select few additional pilots. These additional pilots may include a few auxiliary channel (AC1) pilots and two transmission and multiplexing configuration control (TMCC) pilots. These additional pilots may be located on predetermined 'random' carriers and may be continual (i.e., the pilots may be transmitted in certain subcarriers for any symbol).

The CE method may be segmented into three phases. In the first phase, a MMSE estimation of the three additional pilots (AC1 and TMCC), may estimate the carriers 3, 6 and 9 in addition to the given carrier in 0. These estimations may be based, for instance, on 27 consecutive OFDM symbols in time. Then, in the second phase, an inverse FFT may be performed to calculate the time-domain channel response. The time-domain channel response may then be cleared of noise using a thresholding algorithm. Finally, in the third phase, a frequency-domain response may be calculated. This calculation may then be used for identifying an interpolation for all data subcarriers.

Figure 4:
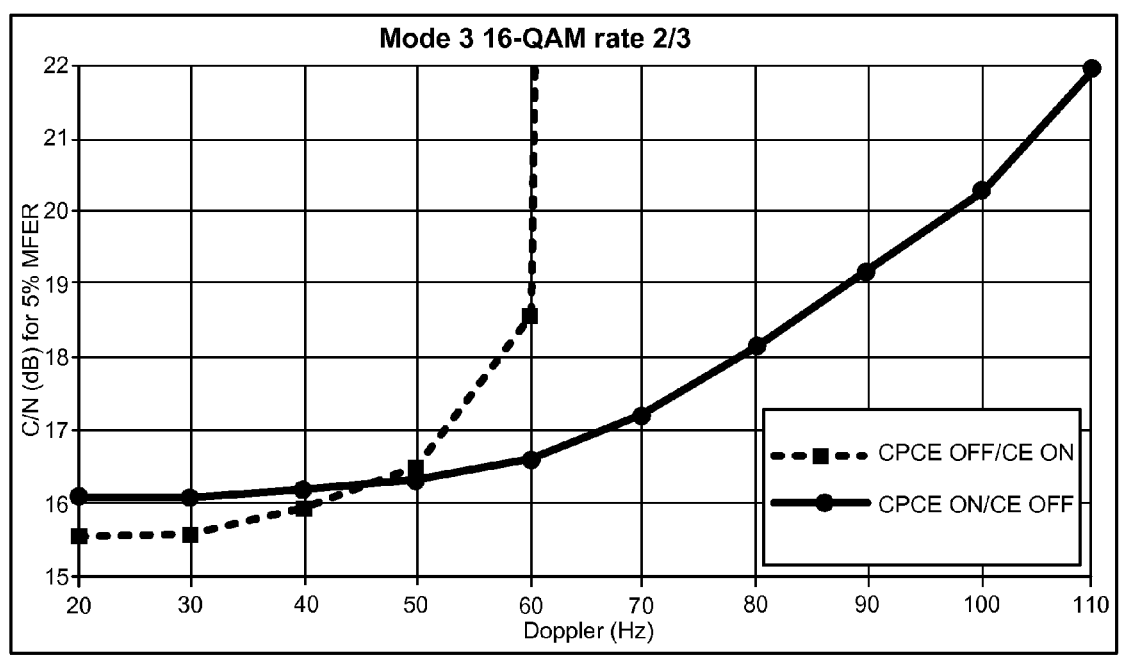
FIG. 4 is a graph of measured channel-to-noise ratio performance of CE and CPCE channel estimation algorithms as a function of Doppler shift for 16 QAM encoding.

As illustrated in FIG. 4, each of the CE and CPCE estimation methods has its own advantages and disadvantages for receiving transmissions in various reception conditions. For instance, in DVB-H 8 k mode, the CE algorithm (indicated in line CPCE OFF) outperforms the CPCE algorithm for channels having low to medium Doppler spreads and Additive White Gaussian Noise (AWGN). As shown in FIG. 4, in cases of channels with a multipath power profile having high Doppler spreads, such as those above 50 Hertz, the CPCE algorithm (CPCE on) outperforms the CE algorithm. FIG. 4 shows the performance of the algorithms in the presence of standard urban multipath profile TU6. FIG. 4 also illustrates that the channel-to-noise (C/N) ratio performance of the CE algorithm rises dramatically as the Doppler spread approaches 60 Hertz. This suggests that the CE algorithm is not effective above 60 Hertz, and that the CPCE algorithm may be preferred over the CE algorithm in reception cases of high Doppler spread.

As previously mentioned, FIG. 4 illustrates that the CPCE algorithm outperforms the CE algorithm above 50 Hertz. However, the CPCE algorithm may not be the preferred algorithm in all reception cases where the Doppler spread is in excess of 50 Hertz. For instance, it has been observed that the CPCE algorithm breaks down for other multipath power profiles. This typically happens when the number of 'significant' paths (i.e. the number of paths that have significant energy) in the channel impulse response is large. Since the CE algorithm is not sensitive to the number of paths in the channel impulse response, the CE algorithm may be much more effective than the CPCE algorithm when the number of 'significant' paths is large. As a result, the CE algorithm may exhibit superior performance in Doppler spreads between 50 and 60 Hertz. In field tests, where the Doppler spread is typically less than 60 Hertz, the CE algorithm generally outperforms the CPCE algorithm. This is especially true when there are a large number of multipath signals present.

While the CE algorithm may exhibit superior field performance in Doppler spreads below 60 Hertz, it may not always be the preferred method for channel estimation in such cases. For instance, the CE algorithm may not meet all the requirements of Mobile Broadband Radio Air Interface (MBRAI) conformance testing. On the other hand, the CPCE algorithm complies with all the requirements of MBRAI, and is able to pass all the mandatory MBRAI conformance tests.

Thus, in some situations, the CPCE algorithm is preferred over the CE algorithm, while in other situations, the CE algorithm is preferred. Accordingly, the various embodiments provide methods and systems for efficiently selecting and switching among the two channel estimation algorithms to maximize system performance. Specifically, the embodiment provide algorithms that allow for the utilization of both the CE and CPCE algorithms to achieve optimal reception performance under a variety of channel conditions.

Figure 5A:
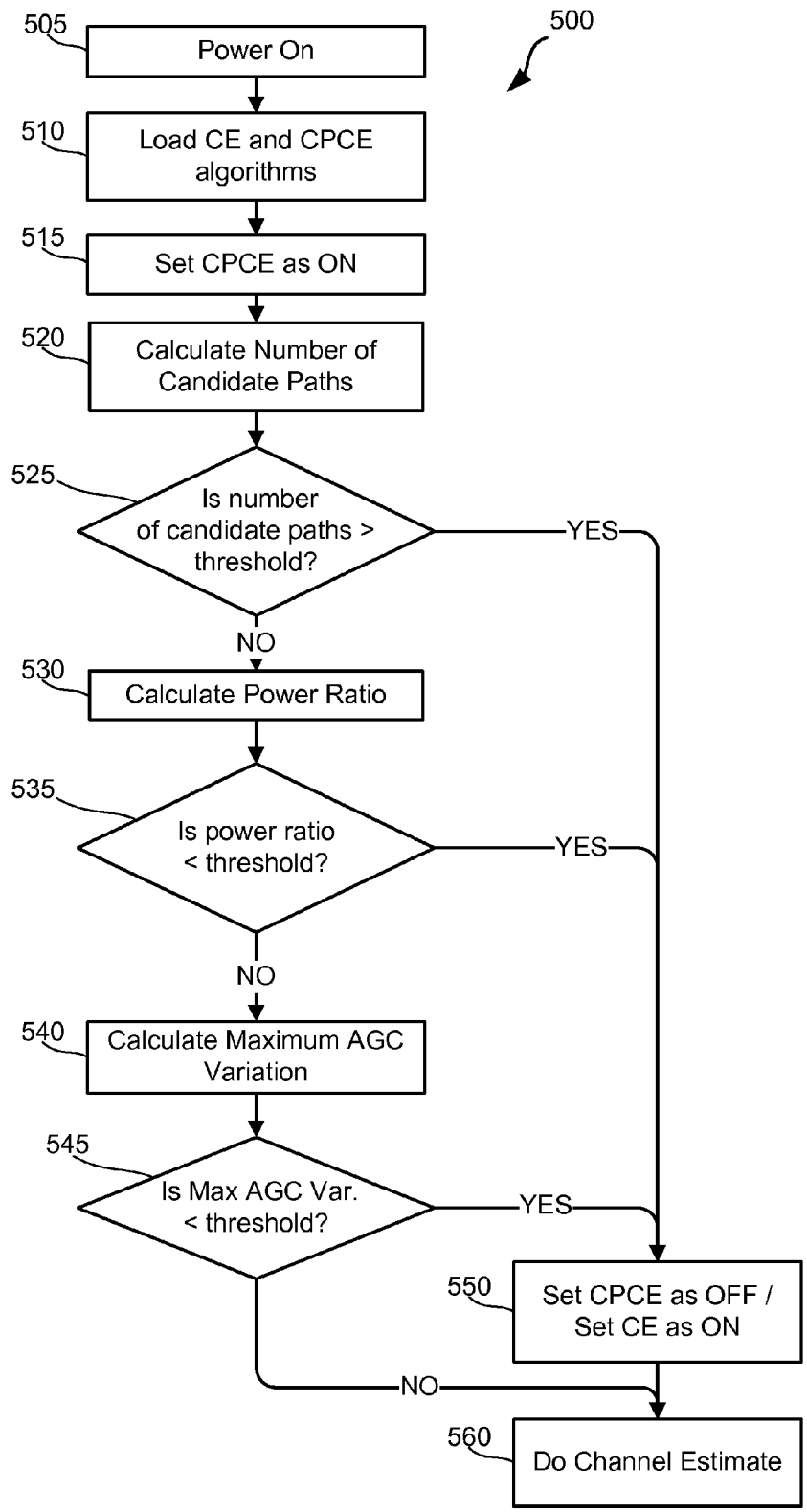
FIG. 5A is a process flow diagram of an embodiment method for selecting a channel estimation algorithm based on channel characteristics.

An embodiment method 500 for selecting among the CE and CPCE algorithms based upon channel conditions is illustrated in FIG. 5A. In method 500, when the receiver circuit powers up in block 505, a processor within a receiver module or receiver device may load both the CE and CPCE algorithms in block 510. In block 515, the processor sets the CPCE algorithm as the default channel estimation algorithm (CPCE ON). In this configuration, the CE algorithm is set as a secondary channel estimation algorithm such that when the CPCE algorithm is disabled (CPCE OFF), the CE algorithm becomes the active channel estimation method. In block 520, the processor may calculate the number of candidate paths based upon the received signal as described in more detail below. In determination block 525, the processor may determine whether the calculated number of candidate paths is greater than a first threshold value. This first threshold value may be predetermined, such as by performing field testing to identify a number of candidate paths where there is a performance advantage in switching to the CE algorithm. If the processor determines the number of candidate paths exceeds the threshold (i.e., determination block 525="YES"), the processor may disable the CPCE algorithm (CPCE OFF) in block 550 and begin using the CE algorithm for channel estimation in block 560.

If the processor determines that the number of candidate paths is less than or equal to the threshold value (i.e., determination block 525="NO"), the processor may calculate the power ratio of the strongest L candidate paths to the received power of all candidate path in the channel in block 530. As mentioned above L equals 40 in one embodiment, 60 in another embodiment, but may be equal to other values as well. This calculation may be accomplished using a methods such as described in more detail below. In determination block 535 the processor may determine whether the power ratio of the L candidate paths with the most power to the power of all the candidate paths is less than a second threshold value. This second threshold value may be predetermined, such as by performing field testing to identify a power ratio below which there is a performance advantage in switching to the CE algorithm. If the processor determines that the calculated power ratio is less than the second threshold (i.e., determination block 535="YES"), the processor may disable the CPCE algorithm in block 550 (i.e., set CPCE OFF), and use the CE method for channel estimation in block 560.

If the processor determines that the power ratio is greater than or equal to the second threshold value (i.e., determination block 535="NO"), the processor may calculate a maximum Automatic Gain Control (AGC) variation between OFDM symbols in block 540. This calculation may be accomplished using a method such as described in more detail below. The maximum AGC variation may be used as a proxy or estimation of the Doppler spread within the received signal. Since the AGC variation is a simple calculation based upon the available AGC information, this calculation provides a simple mechanism for estimating Doppler spread without calculating the value directly. In determination block 545 the processor may compare the maximum AGC variation to a third threshold value. This third threshold value may be predetermined, such as by conducting field testing to identify an AGC variation value at which point there is a performance advantage in using the CE algorithm. If the processor determines that the maximum AGC variation exceeds the third threshold (i.e., determination block 545="YES"), the processor may disable the CPCE algorithm in block 550 (i.e., set CPCE OFF), and use the CE algorithm for channel estimation in block 560.

If the processor determines that the maximum AGC variation does not exceed the third threshold (i.e., determination block 545="NO"), the CPCE algorithm may continue to be used for channel estimation in block 560. Thus, method 500 will select the CPCE algorithm for channel estimation when the number of candidate paths is less than or equal to the first threshold value, the power ratio is greater than or equal to the second threshold value, and the maximum AGC variation is greater than or equal to the third threshold value.

In the various embodiments, the processor may calculate the number of candidate paths in block 525 as follows. At the beginning of each burst (acquisition, recovery and reacquisition), after warm-up, the CPCE or CE algorithm may be performed the obtain a channel estimate. Then, the power of the samples in the channel impulse response may be averaged using an infinite impulse response (IIR) filter for OFDM symbols. In such case, the number of candidate paths may be given by the number of filtered samples in the channel impulse response that exceed a given noise threshold.

In the various embodiments, the processor may calculate the power ratio in block 535 as follows. At the beginning of each burst, after warm-up, the CPCE or CE algorithm may be performed to obtain a channel estimate. The power of the samples of the channel impulse response may then be averaged using an IIR filter for OFDM symbols, as in the calculation of the candidate paths. The power ratio may be given by the sum of the power of L candidate paths with maximum power, divided by the total sum of the power of all the candidate paths. For example, in one embodiment L may be 40 candidate paths, and in another embodiment L may be 60 candidate paths. In these example embodiments, the 40 (or 60) candidate paths may correspond to the "L strongest channel taps" discussed above and described in U.S. Published Patent Application 2008/0084817.

In the various embodiments, the processor may calculate the maximum AGC variation in block 545 as follows. At the beginning of each burst, after warm-up, the AGC variation over consecutive OFDM symbols may be calculated using a formula such as: AGC_VAR(n)=abs[AGC_GAIN_dB(n)−AGC_GAIN_dB(n−1)]. From this, the maximum AGC_VAR (i.e. AGC_VAR_MAX) may be calculated as a function of the OFDM symbols. For example, if a sample of 16 symbols is to be used, the processor may calculate the maximum AGC variation (AGC_VAR_MAX) in block 545 over 16 sequential OFDM symbols as: AGC_VAR_MAX=max{AGC_VAR(1), AGC_VAR(2), . . . , AGC_VAR(15)}.

In another embodiment, the processor in block 545 may additionally determine whether there is a gain state transition between consecutive OFDM symbols. In this embodiment, if there is such a gain state, the processor may ignore the AGC_VAR measurement, or alternatively, set the value to 0.

Figure 5B:
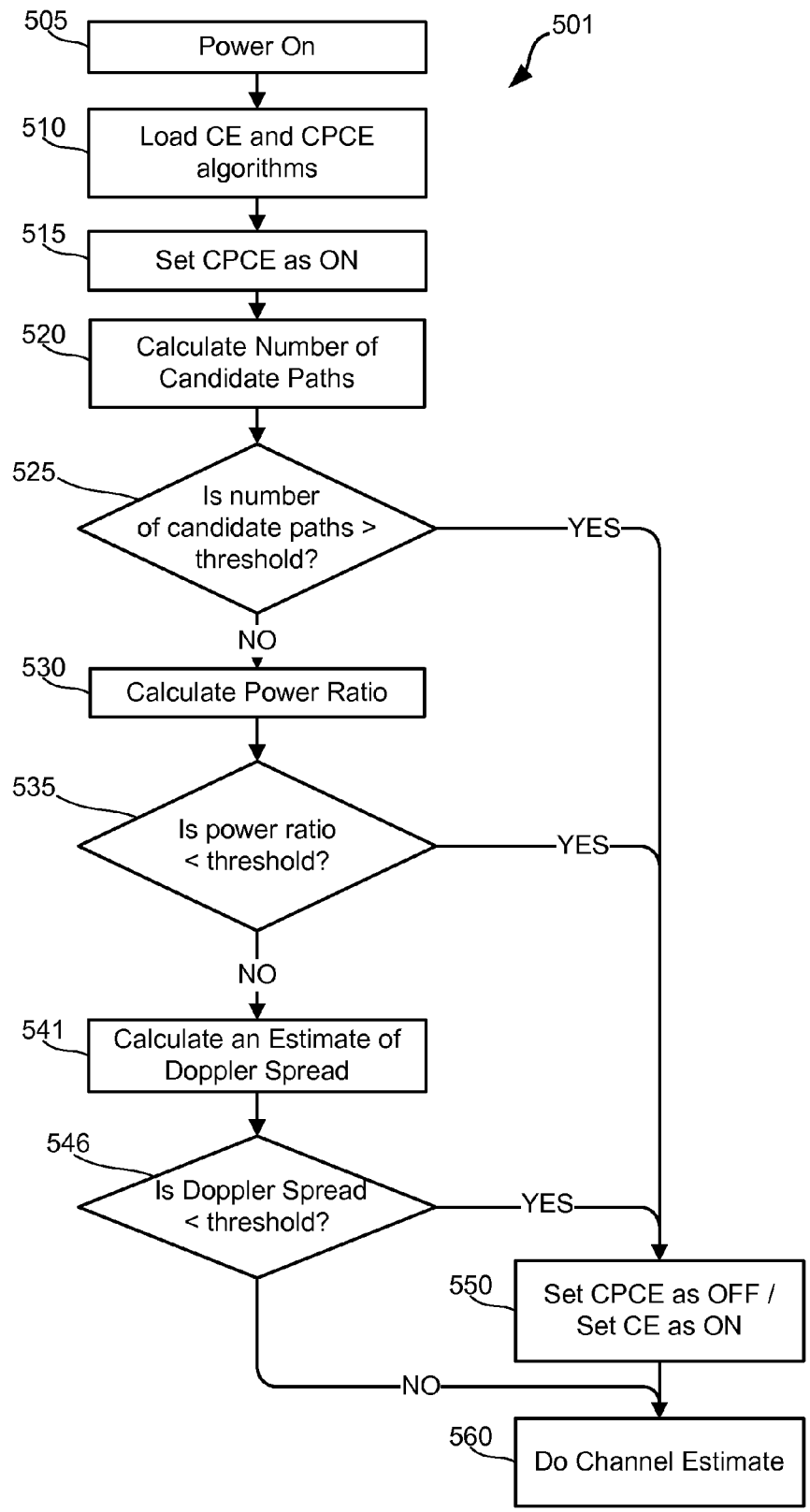
FIG. 5B is a process flow diagram of an alternative embodiment method for selecting a channel estimation algorithm based on channel characteristics.

An alternative embodiment method 501 for selecting among the CE and CPCE algorithms based upon channel conditions is illustrated in FIG. 5B. The operations in method 501 are substantially the same as those described above with reference to FIG. 5A for like numbered blocks with the exception that if the processor determines that the power ratio is greater than or equal to the second threshold value (i.e., determination block 535="NO"), the processor may calculate an estimate of the Doppler spread in block 541. This calculation may be accomplished using any Doppler estimation method known in the art. In determination block 546 the processor may compare the Doppler spread to a third threshold value. If the processor determines that the Doppler spread exceeds the third threshold (i.e., determination block 546="YES"), the processor may disable the CPCE algorithm in block 550 (i.e., set CPCE OFF), and use the CE algorithm for channel estimation in block 560.

Figure 6A:
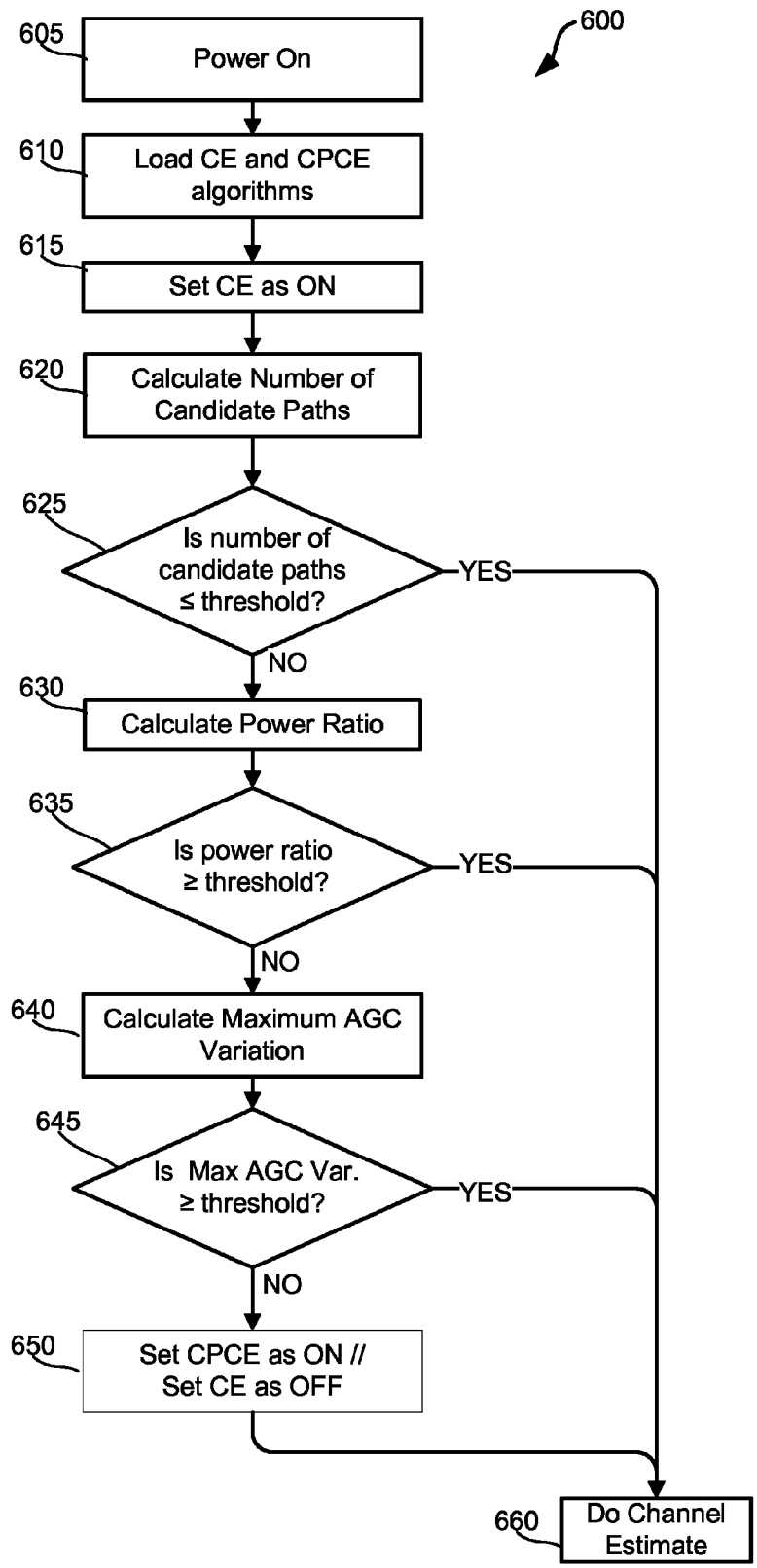
FIG. 6A is a process flow diagram of another alternative embodiment method for selecting a channel estimation algorithm based on channel characteristics.

Another alternative embodiment method 600 for selecting among the CE and CPCE algorithms is illustrated in FIG. 6A. In method 600, after power on a receiver device in block 605, the processor of the receiver device or of a receiver module within the device loads both the CE and CPCE algorithms in block 610. In block 615, the processor sets the CE algorithm as the default channel estimation algorithm (i.e., CPCE OFF). In this configuration, when the CE algorithm is disabled, the CPCE algorithm becomes the active channel estimation method.

In block 620, the processor may calculate the number of candidate paths as described above with reference to FIG. 5A. In determination block 625, the processor may determine whether the number of candidate paths is less than or equal to the first threshold. If so (i.e., determination block 625="YES"), in block 660 the processor uses the CE algorithm for channel estimation. If the processor determines that the number of candidate paths is greater than the first threshold (i.e., determination block 625="NO"), the processor may proceed to block 630, where it calculates a power ratio of L candidate paths with the most power relative to the power of all the candidate paths as described above with reference to FIG. 5A. In various embodiments, L may be 40 or 60 candidate paths.

In determination block 635, the processor may determine whether the power ratio is greater than or equal to the second threshold value. If the processor determines that the power ratio is greater than or equal to the second threshold value (i.e., determination block 635="YES"), the processor may proceed to uses the CE algorithm for channel estimation in block 660. If the processor determines that the power ratio is less than the second threshold value (i.e., determination block 635="YES"), the processor may proceed to block 640 to calculate the maximum AGC variation.

In block 640 the processor may calculate the maximum AGC variation as described above with reference to FIG. 5A. In determination block 645 the processor may determine whether the maximum AGC variation is greater than or equal to the third threshold. If so (i.e., determination block 645="YES"), the processor may proceed to block 660 and use the CE algorithm for channel estimation. However, if the processor determines that the maximum AGC variation is less than the third threshold (i.e., determination block 645="NO"), the processor may switch to the CPCE algorithm in block 650 (i.e., CPCE ON), and use the CPCE algorithm for channel estimation in block 660.

In an alternative embodiment, the processor may set the CPCE algorithm as the default algorithm for channel estimation, and turn off the CPCE algorithm in Additive White Gaussian Noise (AWGN) channel cases. In another embodiment, the processor may switch off the CPCE algorithm (CPCE OFF) when the processor determines that the Doppler spread is less than 60 Hertz. In another embodiment, the processor may switch on the CPCE algorithm (CPCE ON) when the Doppler spread is 60 Hertz or more, and switch off the CPCE algorithm (CPCE OFF) when the Doppler spread is 10 Hertz or less. In another embodiment, the processor may switch off the CPCE algorithm (CPCE OFF) when the processor determines that the number of significant paths is greater than 16 and the Doppler spread is less than 60 Hertz.

It should be noted that the algorithms used to estimate Doppler spread described above (e.g., maximum AGC variation) provide a quick and cost-effective method of estimating the Doppler spread. However, in various embodiments, other Doppler estimation algorithms known in the art may also be used to estimate or calculate the Doppler spread. Thus, nothing in this application should be read as limiting the Doppler spread calculation method to any one particular algorithm, unless specifically recited by the claims.

In an embodiment, the AGC based third threshold may be set at 0.5 dB. In an embodiment, the candidate path first threshold may be set to 110, and the power ratio second threshold may be set 0.905 for 16-QAM encoding. In an embodiment, the candidate path first threshold may be set to 112, and the power ratio second threshold may be set to 0.90 for QPSK encoding.

Figure 6B:
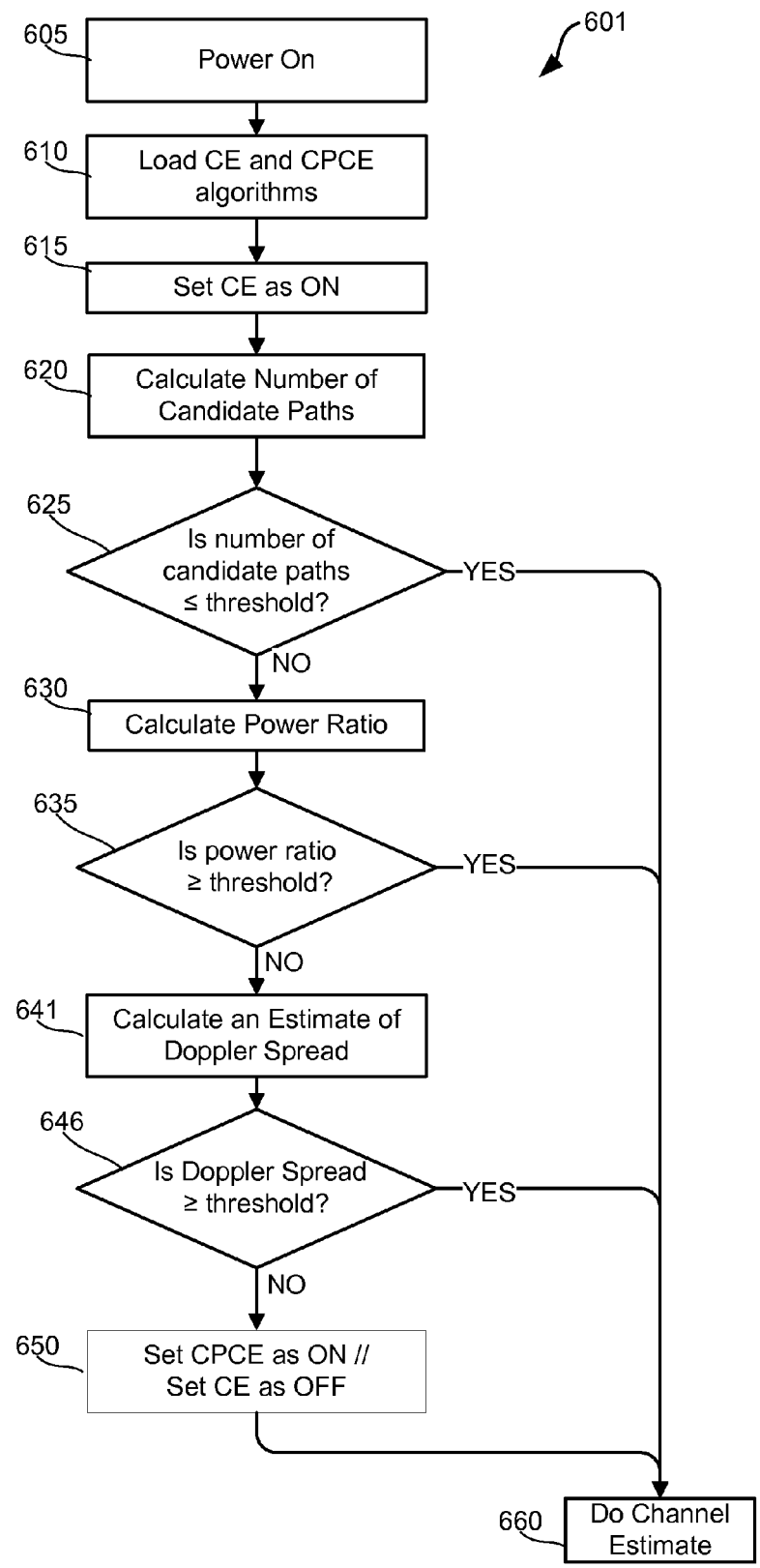
FIG. 6B is a process flow diagram of another alternative embodiment method for selecting a channel estimation algorithm based on channel characteristics.

Another alternative embodiment method 601 for selecting among the CE and CPCE algorithms that uses a direct calculation or estimate of Doppler spread is illustrated in FIG. 6B. The operations in method 601 are substantially the same as those described above with reference to FIG. 6A for like numbered blocks with the exception that block 641 the processor may calculate an estimate of the Doppler spread, as described above with reference to FIG. 5B. In determination block 646 the processor may determine whether the Doppler spread is greater than or equal to the third threshold. If so (i.e., determination block 646="YES"), the processor may proceed to block 660 and use the CE algorithm for channel estimation. However, if the processor determines that the Doppler spread is less than the third threshold (i.e., determination block 646="NO"), the processor may switch to the CPCE algorithm in block 650 (i.e., CPCE ON), and use the CPCE algorithm for channel estimation in block 660.

In the various embodiments described above, the selections of channel estimation methods are generally shown to be accomplished at the beginning of each burst. However, in various embodiments the selection of channel estimation algorithms, or the switching between the channel estimation algorithms, may be accomplished during the reception of a burst, using the same procedures as described above. Therefore, nothing in this application should be read as limiting the various embodiments to making the selections at the beginning of each burst, unless specifically recited by the claims.

Figure 7:
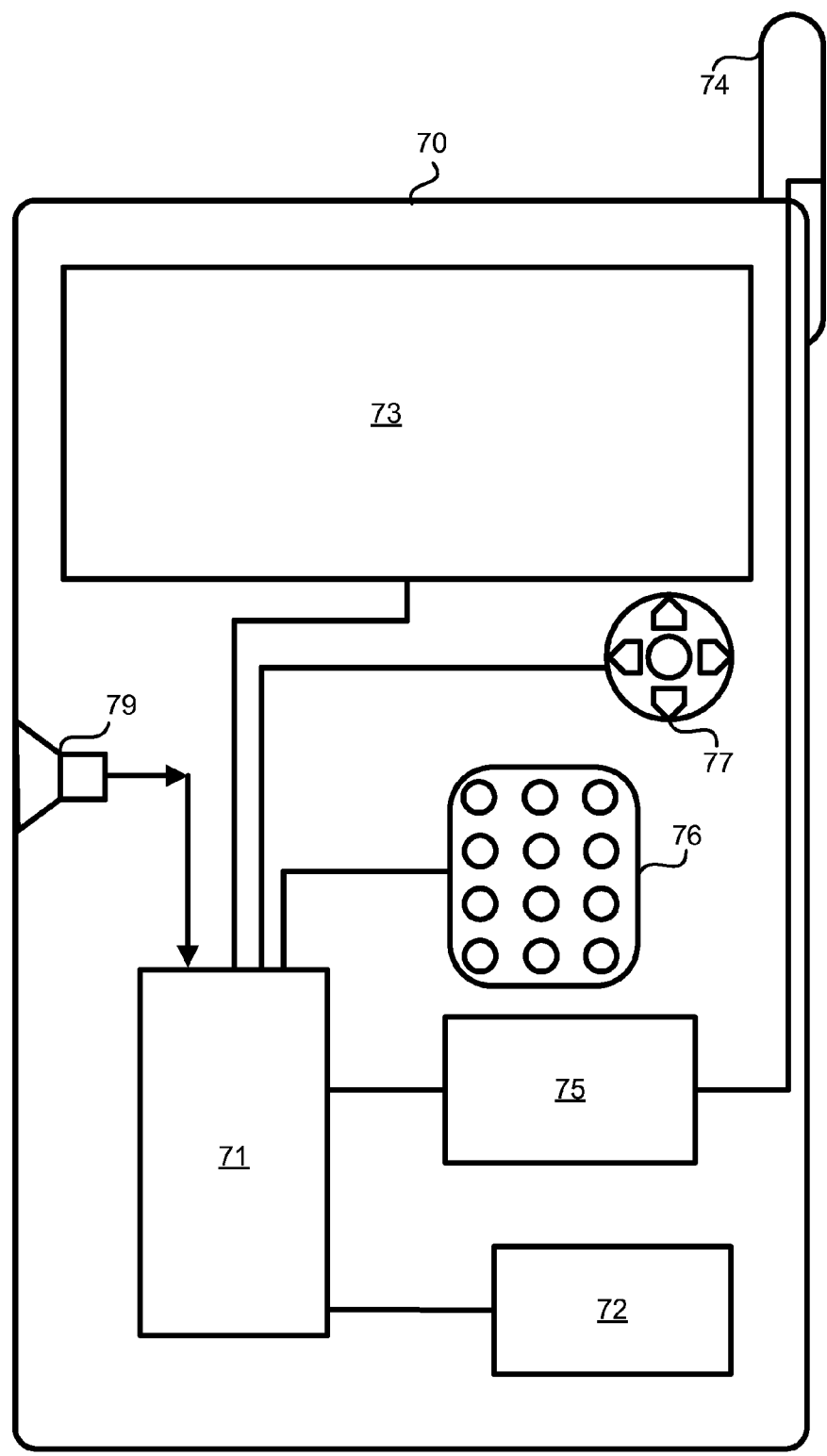
FIG. 7 is a component block diagram of wireless receiver device suitable for use with the various embodiments.

The various embodiments described above may be implemented in a wide variety of wireless receiver devices. Typical wireless receiver devices 70 suitable for use with the various embodiments will have in common the components illustrated in FIG. 7. For example, an exemplary wireless receiver device 70 may include a processor 71 coupled to internal memory 72, a display 73, and to a speaker 79. Additionally, the wireless receiver device 70 may have an antenna 74 for receiving electromagnetic radiation that is connected to a wireless data link transceiver 75 coupled to the processor 71. Wireless receivers 70 typically also include a key pad 76 or miniature keyboard and menu selection buttons or rocker switches 77 for receiving user inputs.

The processor 71 may be any programmable microprocessor, microcomputer or multiple processor chip or chips that can be configured by software instructions (applications) to perform a variety of functions, including the functions of the various embodiments described herein. In some mobile devices, multiple processors 71 may be provided, such as one processor dedicated to wireless communication functions and one processor dedicated to running other applications. The various embodiments may be implemented within a processor 71 that is included within a wireless receiver chip and used for controlling processes associated with receiving, decoding and processing wireless communication signals.

Typically, software applications may be stored in the internal memory 72 before they are accessed and loaded into the processor 71. In some mobile devices, the processor 71 may include internal memory sufficient to store the application software instructions. In many wireless receivers 7, the internal memory 72 may be a volatile or nonvolatile memory, such as flash memory, or a mixture of both. For the purposes of this description, a general reference to memory refers to all memory accessible by the processor 71, including internal memory 72, removable memory plugged into the wireless receiver 70, and memory within the processor 71 itself.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A channel estimation method, comprising:
   loading a first method of deriving a channel estimate into a wireless receiver processor, the first method using a method of channel estimation advantageous in reception situations having high Doppler spreads;
   loading a second method of deriving a channel estimate into the wireless receiver processor, the second method using a method of channel estimation advantageous in reception situations having low Doppler spreads;
   identifying a plurality of candidate paths, each candidate path having a power attribute;
   extracting a plurality of significant candidate paths from the identified plurality of candidate paths;
   calculating a power ratio of the power attribute of the extracted plurality of significant candidate paths relative to total power of all the plurality of identified candidate paths;
   determining if the calculated power ratio is less than a first threshold value;
   selecting, in the wireless receiver processor, the first method of deriving a channel estimate if the calculated power ratio was determined to be greater than or equal to the first threshold value, otherwise selecting the second method; and
   using the selected method to derive the channel estimation in the wireless receiver processor.

2. The method of claim 1, wherein the second method uses a method of channel estimation that is both advantageous in reception situations having low Doppler spreads and not sensitive to multiple reception paths.

3. The method of claim 1, wherein the second method uses a minimum mean-square error (CE) method of channel estimation as the method of channel estimation advantageous in reception situations having low Doppler spreads.

4. The method of claim 1, further comprising:
   calculating a Doppler spread;
   determining a number of identified candidate paths in the identified plurality of candidate paths is greater than a second threshold value;
   determining if the calculated Doppler spread is less than a third threshold value; and
   selecting the second method if
   (A) the number of identified candidate paths in the identified plurality of candidate paths is determined to be greater than the second threshold value,
   (B) the calculated power ratio is determined to be less than the first threshold value, or
   (C) the calculated Doppler spread is determined to be less than the third threshold value.

5. The method of claim 4, wherein the calculating of the Doppler spread includes calculating the maximum Automatic Gain Control (AGC) variation.

6. The method of claim 1, further comprising:
   calculating a Doppler spread;
   determining if a number of identified candidate paths in the identified plurality of candidate paths is less than or equal to a second threshold value;

determining if the Doppler spread is greater than, or equal to, a third threshold value; and selecting the first method if
(1) the number of identified candidate paths is determined to be less than or equal to the second threshold value,
(2) the calculated power ratio is determined to be greater than or equal to the first threshold value, and
(3) the calculated Doppler spread is determined to be greater than or equal to the third threshold value.

7. The method of claim 6, wherein the calculating of the Doppler spread includes calculating the maximum Automatic Gain Control (AGC) variation and using the maximum AGC as a measure of the Doppler spread.

8. The method of claim 1, further comprising:
calculating a number of candidate paths;
determining if the calculated number of candidate paths is greater than a second threshold value; and
selecting the second method if the calculated number of candidate paths was determined to be greater than the second threshold value, otherwise selecting the first method.

9. The method of claim 8, wherein the calculated number of candidate paths is calculated by using a minimum mean-square error method.

10. The method of claim 8, wherein:
an infinite impulse response (IIR) filter is used to filter samples in a channel impulse response; and
the calculated number of candidate paths is calculated as a number of filtered samples in the channel impulse response that exceed a predefined noise threshold.

11. The method of claim 1, wherein the identifying of the plurality of candidate paths includes using a minimum mean-square error method.

12. The method of claim 1, wherein the plurality of significant candidate paths are extracted based on the candidate paths having a high power attribute.

13. The method of claim 12, wherein the power ratio is calculated as a sum of the power attributes of the plurality of significant candidate paths divided by a sum of the power attributes of the plurality of identified candidate paths.

14. The method of claim 12, wherein forty significant candidate paths are extracted.

15. The method of claim 12, wherein sixty significant candidate paths are extracted.

16. The method of claim 1, further comprising:
calculating a Doppler spread;
determining if the calculated Doppler spread is less than a second threshold value; and
selecting the second method if the Doppler spread is determined to be less than the second threshold value, otherwise selecting the first method.

17. The method of claim 16, wherein the calculating the Doppler spread includes calculating a maximum Automatic Gain Control (AGC) variation.

18. The method of claim 1, wherein the first method uses a continuous pilot channel estimation (CPCE) method of channel estimation as the method of channel estimation advantageous in reception situations having high Doppler spreads.

19. A wireless receiver device, comprising:
means for loading a first method of deriving a channel estimate, the first method using a method of channel estimation advantageous in reception situations having high Doppler spreads;
means for loading a second method of deriving a channel estimate, the second method using a method of channel estimation advantageous in reception situations having low Doppler spreads;
means for identifying a plurality of candidate paths, each candidate path having a power attribute;
means for extracting a plurality of significant candidate paths from the identified plurality of candidate paths;
means for calculating a power ratio of the power attribute of the extracted plurality of significant candidate paths relative to total power of all the plurality of identified candidate paths;
means for determining if the calculated power ratio is less than a first threshold value;
means for selecting the first method of deriving a channel estimate if the calculated power ratio was determined to be greater than or equal to the first threshold value, otherwise selecting the second method; and
means for using the selected method to derive the channel estimation.

20. The wireless receiver device of claim 19, wherein the second method uses a method of channel estimation that is both advantageous in reception situations having low Doppler spreads and not sensitive to multiple reception paths.

21. The wireless receiver device of claim 19, wherein the second method uses a minimum mean-square error (CE) method of channel estimation as the method of channel estimation advantageous in reception situations having low Doppler spreads.

22. The wireless receiver device of claim 19, further comprising:
means for calculating a Doppler spread;
means for determining if a number of identified candidate paths in the identified plurality of candidate paths is greater than a second threshold value;
means for determining if the Doppler spread is less than a third threshold value; and
means for selecting the second method if
(A) the number of identified candidate paths in the identified plurality of candidate paths is determined to be greater than the second threshold value,
(B) the calculated power ratio is determined to be less than the second threshold value, or
(C) the calculated Doppler spread is determined to be less than the third threshold value.

23. The wireless receiver device of claim 22, wherein the means for calculating the Doppler spread includes a means for calculating the maximum Automatic Gain Control (AGC) variation.

24. The wireless receiver device of claim 19, wherein further comprising:
means for calculating a Doppler spread;
means for determining if a number of identified candidate paths in the identified plurality of candidate paths is less than or equal to a second threshold value;
means for determining if the Doppler spread is greater than, or equal to, a third threshold value; and
means for selecting the first method if
(1) the number of candidate paths is determined to be less than or equal to the second threshold value,
(2) the calculated power ratio is determined to be greater than or equal to the first threshold value, and
(3) the calculated Doppler spread is determined to be greater than or equal to the third threshold value.

25. The wireless receiver device of claim 24, wherein the means for calculating the Doppler spread includes a means for calculating the maximum Automatic Gain Control (AGC) variation and a means for using the maximum AGC as a measure of the Doppler spread.

26. The wireless receiver device of claim 19, further comprising:

means for calculating a number of candidate paths;
means for determining if the calculated number of candidate paths is greater than a second threshold value; and
selecting the second method if the calculated number of candidate paths was determined to be greater than the second threshold value, otherwise selecting the first method.

27. The wireless receiver device of claim 26, wherein the calculated number of candidate paths is calculated by using a minimum mean-square error method.

28. The wireless receiver device of claim 26, wherein:
an infinite impulse response (IIR) filter is used to filter samples in a channel impulse response; and
the calculated number of candidate paths is calculated as a number of filtered samples in the channel impulse response that exceed a predefined noise threshold.

29. The wireless receiver device of claim 19, wherein the means for identifying of the plurality of candidate paths includes using a minimum mean-square error method.

30. The wireless receiver device of claim 19, wherein the plurality of significant candidate paths are extracted based on the candidate paths having a high power attribute.

31. The wireless receiver device of claim 30, wherein the means for calculating the power ratio comprises means for calculating the power ratio as a sum of the power attributes of the plurality of significant candidate paths divided by a sum of the power attributes of the plurality of identified candidate paths.

32. The wireless receiver device of claim 30, wherein forty significant candidate paths are extracted.

33. The wireless receiver device of claim 30, wherein sixty significant candidate paths are extracted.

34. The wireless receiver device of claim 19, further comprising:
means for calculating a Doppler spread;
means for determining if the calculated Doppler spread is less than a second threshold value; and
means for selecting the second method if the Doppler spread is determined to be less than the second threshold value, otherwise selecting the first method.

35. The wireless receiver device of claim 34, wherein the means for calculating the Doppler spread includes means for calculating a maximum Automatic Gain Control (AGC) variation.

36. The wireless receiver device of claim 19, wherein the first method uses a continuous pilot channel estimation (CPCE) method of channel estimation as the method of channel estimation advantageous in reception situations having high Doppler spreads.

37. A wireless receiver device, comprising:
a memory buffer; and
a processor coupled to the memory buffer, wherein the processor is configured with software instructions to perform operations comprising:
load a first method of deriving a channel estimate, the first method using a method of channel estimation advantageous in reception situations having high Doppler spreads;
load a second method of deriving a channel estimate, the second method using a method of channel estimation advantageous in reception situations having low Doppler spreads;
identify a plurality of candidate paths, each candidate path having a power attribute;
extract a plurality of significant candidate paths from the identified plurality of candidate paths;
calculate a power ratio of the power attribute of the plurality of extracted significant candidate paths relative to total power of all the identified plurality of candidate paths;
determine if the calculated power ratio is less than a first threshold value;
select the first method of deriving a channel estimate if the calculated power ratio was determined to be greater than or equal to the first threshold value, otherwise select the second method; and
use the selected method to derive the channel estimation.

38. The wireless receiver device of claim 37, wherein the processor is configured such that the second method uses a method of channel estimation that is both advantageous in reception situations having low Doppler spreads and not sensitive to multiple reception paths.

39. The wireless receiver device of claim 37, wherein the processor is configured with processor-executable instructions such that the second method uses a minimum mean-square error (CE) method of channel estimation as the method of channel estimation advantageous in reception situations having low Doppler spreads.

40. The wireless receiver device of claim 37, wherein the processor is further configured with processor-executable instructions to perform operations comprising:
calculate a Doppler spread;
determine if a number of identified candidate paths in the identified plurality of candidate paths is greater than a second threshold value;
determine if the Doppler spread is less than a third threshold value; and
select the second method if
(A) the number of identified candidate paths in the identified plurality of candidate paths is determined to be greater than the second threshold value,
(B) the calculated power ratio is determined to be less than the threshold value, or
(C) the calculated Doppler spread is determined to be less than the third threshold value.

41. The wireless receiver device of claim 40, wherein the processor is configured with processor-executable instructions to calculate the Doppler spread includes calculating the maximum Automatic Gain Control (AGC) variation.

42. The wireless receiver device of claim 37, wherein the processor is further configured with processor-executable instructions to perform operations comprising:
calculate a Doppler spread;
determine if a number of identified candidate paths in the identified plurality of candidate paths is less than or equal to a second threshold value;
determine if the Doppler spread is greater than, or equal to, a third threshold value; and
select the first method if
(1) the number of identified candidate paths is determined to be less than or equal to the second threshold value,
(2) the calculated power ratio is determined to be greater than or equal to the first threshold value, and
(3) the calculated Doppler spread is determined to be greater than or equal to the third threshold value.

43. The wireless receiver device of claim 42, wherein the processor is configured with processor-executable instructions such that calculating the Doppler spread includes calculating the maximum Automatic Gain Control (AGC) variation and using the maximum AGC as a measure of the Doppler spread.

44. The wireless receiver device of claim 37, wherein the processor is further configured with processor-executable instructions to perform operations comprising:
- calculate a number of candidate paths;
- determine if the calculated number of candidate paths is greater than a second threshold value; and
- select the second method if the calculated number of candidate paths was determined to be greater than the second threshold value, otherwise select the first method.

45. The wireless receiver device of claim 44, wherein the processor is configured with processor-executable instructions such that the number of candidate paths is calculated by using a minimum mean-square error method.

46. The wireless receiver device of claim 44, wherein the processor is configured with processor-executable instructions such that:
- an infinite impulse response (IIR) filter logic is used to filter samples in a channel impulse response, and
- the number of candidate paths is calculated as the number of filtered samples in the channel impulse response that exceed a predefined noise threshold.

47. The wireless receiver device of claim 37, wherein the processor is configured with processor-executable instructions to identify the plurality of candidate paths includes using a minimum mean-square error method.

48. The wireless receiver device of claim 37, wherein the processor is configured with processor-executable instructions such that the plurality of significant candidate paths are extracted based on the candidate paths having a high power attribute.

49. The wireless receiver device of claim 48, wherein the processor is configured with processor-executable instructions such that the power ratio is calculated as a sum of the power attributes of the plurality of significant candidate paths divided by a sum of the power attributes of the plurality of identified candidate paths.

50. The wireless receiver device of claim 48, wherein the processor is configured with processor-executable instructions such that forty significant candidate paths are extracted.

51. The wireless receiver device of claim 48, wherein the processor is configured with processor-executable instructions such that sixty significant candidate paths are extracted.

52. The wireless receiver device of claim 37, wherein the processor is further configured with processor-executable instructions comprises to perform operations comprising:
- calculate a Doppler spread;
- determine if the Doppler spread is less than a second threshold value; and
- select the second method if the Doppler spread is determined to be less than the second threshold value, otherwise select the first method.

53. The wireless receiver device of claim 52, wherein the processor is configured with processor-executable instructions such that calculating the Doppler spread includes calculating a maximum Automatic Gain Control (AGC) variation.

54. The wireless receiver device of claim 37, wherein the processor is configured with processor-executable instructions such that the first method uses a continuous pilot channel estimation (CPCE) method of channel estimation as the method of channel estimation advantageous in reception situations having high Doppler spreads.

55. A non-transitory processor-readable storage medium having stored thereon processor-executable software instructions configured to cause an wireless receiver device processor to perform operations comprising:
- load a first method of deriving a channel estimate, the first method using a method of channel estimation advantageous in reception situations having high Doppler spreads;
- load a second method of deriving a channel estimate, the second method using a method of channel estimation advantageous in reception situations having low Doppler spreads;
- identify a plurality of candidate paths, each candidate path having a power attribute;
- extract a plurality of significant candidate paths from the identified plurality of candidate paths;
- calculate a power ratio of the power of the significant candidate paths relative to total power of all the identified candidate paths;
- determine if the calculated power ratio is less than a first threshold value;
- select the first method of deriving a channel estimate if the calculated power ratio was determined to be greater than or equal to the first threshold value, otherwise select the second method; and
- use the selected method to derive the channel estimation.

56. The non-transitory processor-readable storage medium of claim 55, wherein the processor-executable software instructions are configured to cause the processor to perform operations such that the second method uses a method of channel estimation that is both advantageous in reception situations having low Doppler spreads and not sensitive to multiple reception paths.

57. The non-transitory processor-readable storage medium of claim 55, wherein the processor-executable software instructions are configured to cause the processor to perform operations such that the second method uses a minimum mean-square error (CE) method of channel estimation as the method of channel estimation advantageous in reception situations having low Doppler spreads.

58. The non-transitory processor-readable storage medium of claim 55, wherein the processor-executable software instructions are further configured to cause the processor to perform operations comprising:
- calculate a Doppler spread;
- determine a number of identified candidate paths in the identified plurality of candidate paths is greater than a second threshold value;
- determine if the Doppler spread is less than a third threshold value; and
- select the second method if
- (A) the number of identified candidate paths in the identified plurality of candidate paths is determined to be greater than the first-second threshold value,
- (B) the calculated power ratio is determined to be less than the second threshold value, or
- (C) the calculated Doppler spread is determined to be less than the third threshold value.

59. The non-transitory processor-readable storage medium of claim 58, wherein the processor-executable software instructions are configured to cause the processor to perform operations such that calculating the Doppler spread includes calculating the maximum Automatic Gain Control (AGC) variation.

60. The non-transitory processor-readable storage medium of claim 55, wherein the processor-executable software instructions are further configured to cause the processor to perform operations comprising:
- calculate a Doppler spread;
- determine if a number of identified candidate paths is less than or equal to a second threshold value;

determine if the Doppler spread is greater than, or equal to, a third threshold value; and
select the first method if
(1) the calculated number of identified candidate paths is determined to be less than or equal to the second threshold value,
(2) the calculated power ratio is determined to be greater than or equal to the first threshold value, and
(3) the calculated Doppler spread is determined to be greater than or equal to the third threshold value.

61. The non-transitory processor-readable storage medium of claim 60, wherein the processor-executable software instructions are configured to cause the processor to perform operations to calculate the Doppler spread includes calculating the maximum Automatic Gain Control (AGC) variation and using the maximum AGC as a measure of the Doppler spread.

62. The non-transitory processor-readable storage medium of claim 55, wherein the processor-executable software instructions are further configured to cause the processor to perform operations comprising:
calculate a number of candidate paths;
determine if the number of candidate paths is greater than a second threshold value; and
select the second method if the number of candidate paths was determined to be greater than the second threshold value, otherwise select the first method.

63. The non-transitory processor-readable storage medium of claim 62, wherein the processor-executable software instructions are configured to cause the processor to perform operations such that the number of candidate paths is calculated by using a minimum mean-square error method.

64. The non-transitory processor-readable storage medium of claim 63, wherein the processor-executable software instructions are configured to cause the processor to perform operations such that:
an infinite impulse response (IIR) filter logic is used to filter samples in a channel impulse response, and
the number of candidate paths is calculated as the number of filtered samples in the channel impulse response that exceed a predefined noise threshold.

65. The non-transitory processor-readable storage medium claim 55, wherein the processor-executable software instructions are configured to cause the processor to perform operations such that identify the plurality of candidate paths includes using a minimum mean-square error method.

66. The non-transitory processor-readable storage medium of claim 55, wherein the processor-executable software instructions are configured to cause the processor to perform operations such that the plurality of significant candidate paths are extracted based on the candidate paths having a high power attribute.

67. The non-transitory processor-readable storage medium of claim 66, wherein the processor-executable software instructions are configured to cause the processor to perform operations such that the power ratio is calculated as a sum of the power attributes of the plurality of significant candidate paths divided by a sum of the power attributes of the plurality of identified candidate paths.

68. The non-transitory processor-readable storage medium of claim 66, wherein the processor-executable software instructions are configured to cause the processor to perform operations such that forty significant candidate paths are extracted.

69. The non-transitory processor-readable storage medium of claim 66, wherein the processor-executable software instructions are configured to cause the processor to perform operations such that sixty significant candidate paths are extracted.

70. The non-transitory processor-readable storage medium of claim 55, wherein the processor-executable software instructions are further configured to cause the processor to perform operations comprising:
calculate a Doppler spread;
determine if the Doppler spread is less than a second threshold value; and
select the second method if the Doppler spread is determined to be less than the second threshold value, otherwise select the first method.

71. The non-transitory processor-readable storage medium of claim 70 wherein the processor-executable software instructions are configured to cause the processor to perform operations such that calculating the Doppler spread includes calculating a maximum Automatic Gain Control (AGC) variation.

72. The non-transitory processor-readable storage medium of claim 55, wherein the processor-executable software instructions are configured to cause the processor to perform operations such that the first method uses a continuous pilot channel estimation (CPCE) method of channel estimation as the method of channel estimation advantageous in reception situations having high Doppler spreads.

* * * * *